Nov. 25, 1941.  I. C. McKECHNIE  2,264,001
POWER TRANSMISSION
Filed Nov. 1, 1940  4 Sheets-Sheet 1
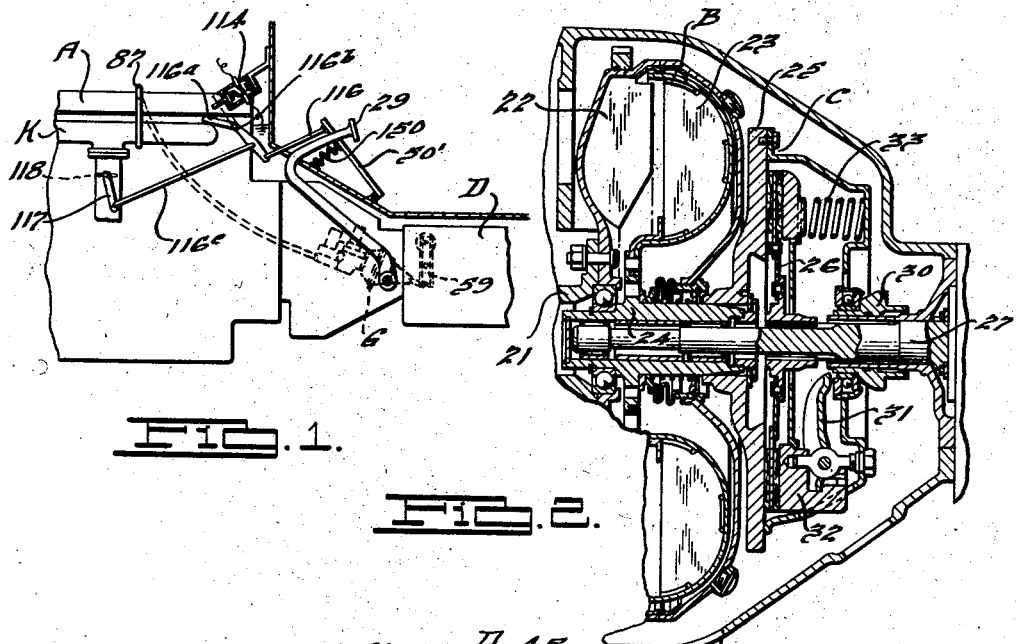
Fig. 1.
Fig. 2.
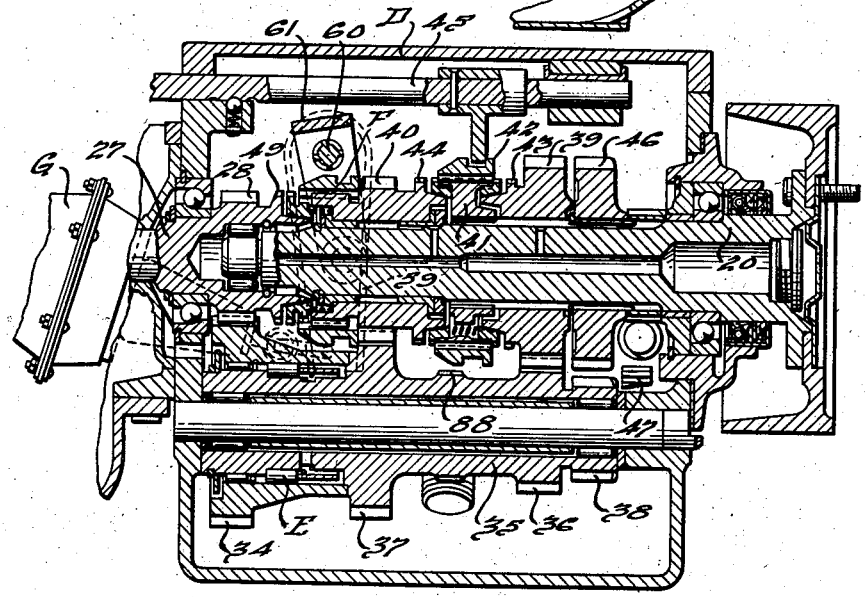
Fig. 3.
INVENTOR
Ian C. McKechnie.
BY
ATTORNEYS.

Nov. 25, 1941.   I. C. McKECHNIE   2,264,001
POWER TRANSMISSION
Filed Nov. 1, 1940   4 Sheets-Sheet 2
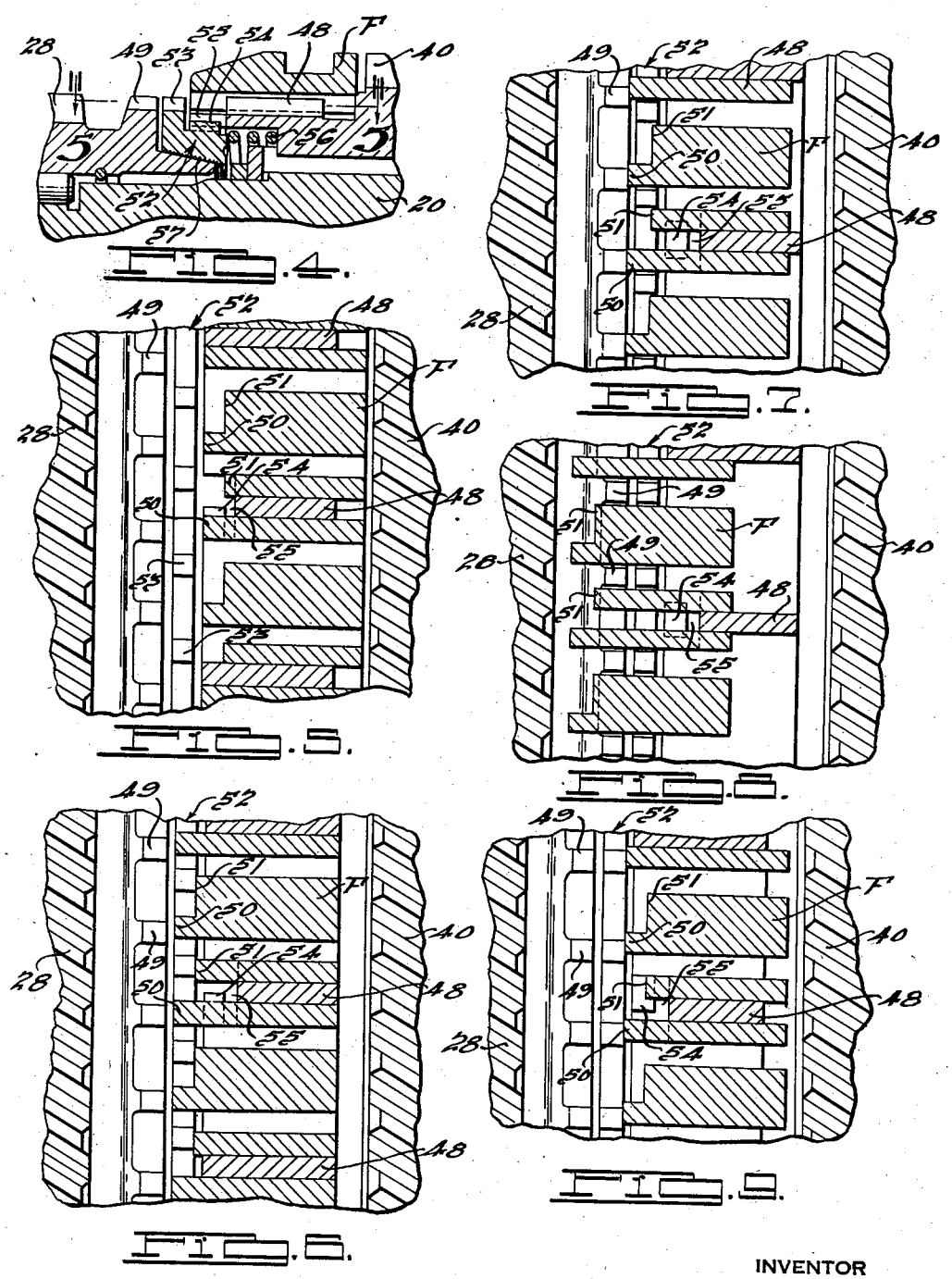
INVENTOR
Ian C. McKechnie.
BY
Harness, Dickey, Pierce & Harris
ATTORNEYS.

Nov. 25, 1941.  I. C. McKECHNIE  2,264,001
POWER TRANSMISSION
Filed Nov. 1, 1940  4 Sheets-Sheet 3
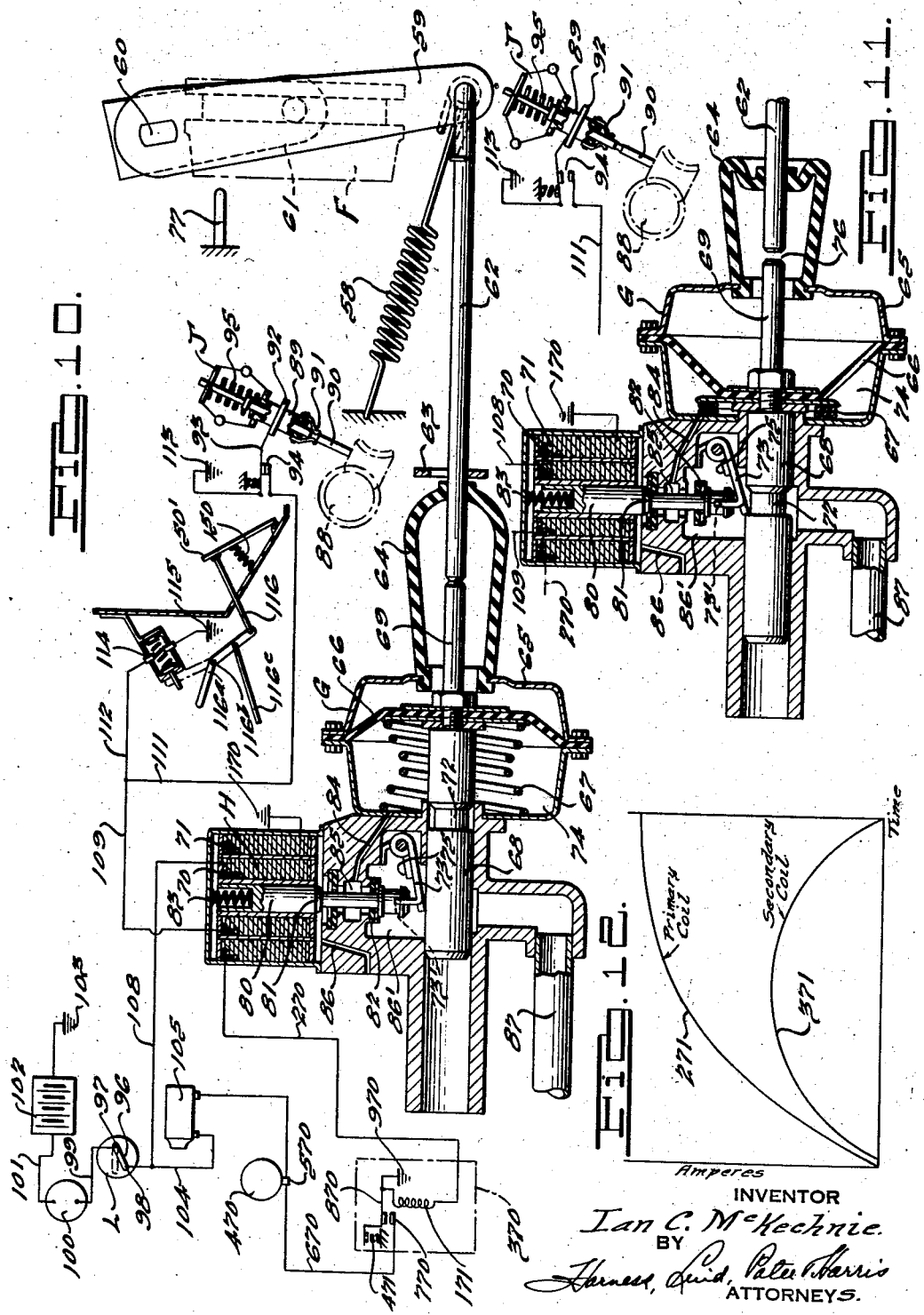

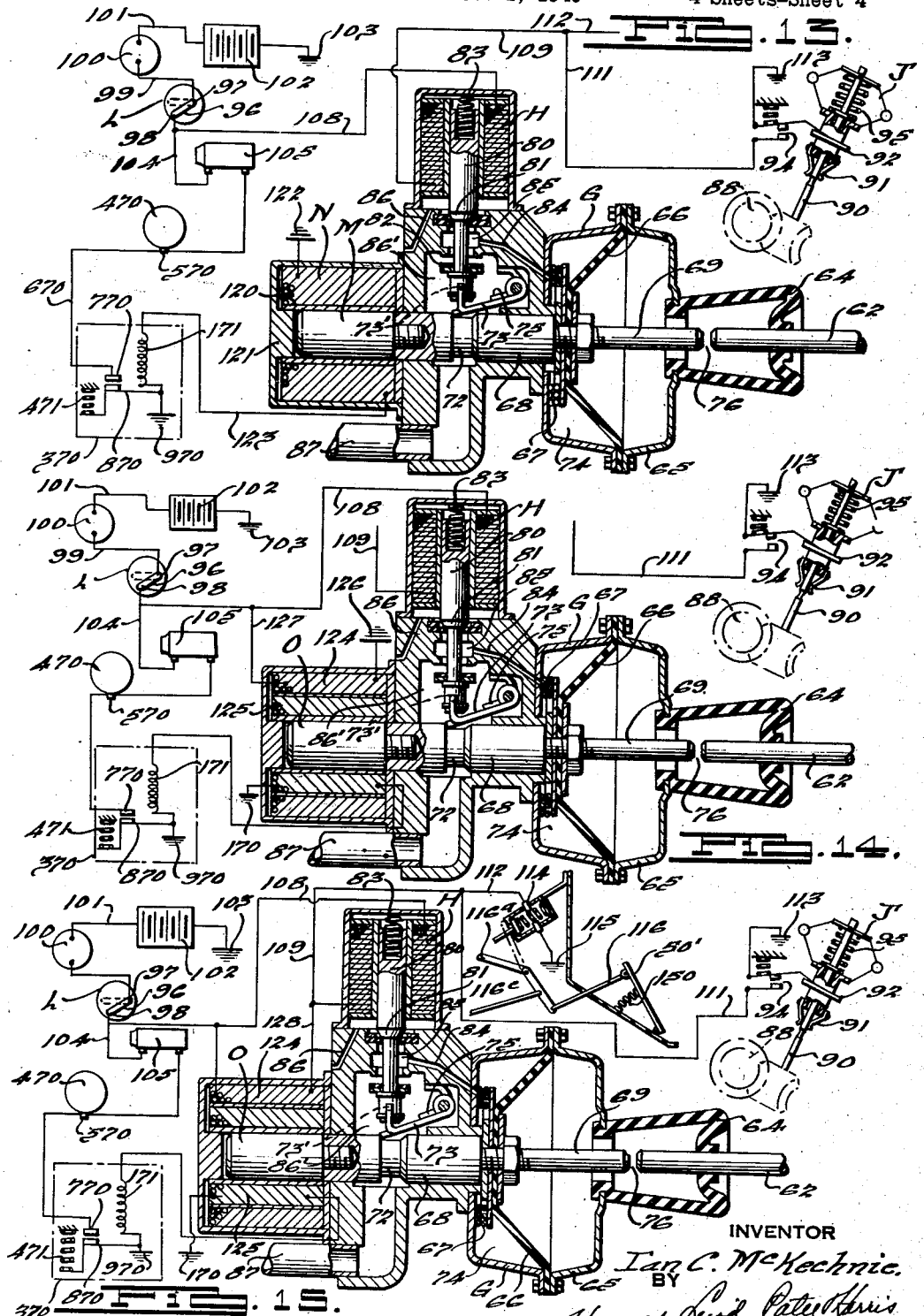

Patented Nov. 25, 1941

2,264,001

UNITED STATES PATENT OFFICE 2,264,001

POWER TRANSMISSION

Ian C. McKechnie, Detroit, Mich., assignor to Chrysler Corporation, Highland Park, Mich., a corporation of Delaware Application November 1, 1940, Serial No. 363,946

28 Claims. (Cl. 74—472)

This invention relates to motor vehicles and refers more particularly to power transmission and control mechanism therefor.

My invention has particular reference to transmission systems in which the torque load is relieved as by momentary interruption of the engine ignition in order to unload positively engageable drive control elements so as to facilitate disengagement of such elements. One example of such a transmission is described and claimed in the copending application of Carl A. Neracher et al., Serial No. 335,310, filed May 15, 1940. In such transmission systems, the engine ignition sometimes is grounded beyond the desired momentary period either as a characteristic of the transmission control mechanism, because of failure of the mechanism to properly function, sticking of the grounding switch, or for other reasons. When the ignition system is thus interrupted, usually by grounding the same, the engine is rendered inoperative so that the car cannot be driven under its own power, or the change speed mechanism does not function properly.

It is an object of my invention to provide improved means for overcoming the aforesaid difficulties.

Another object is to provide improved means for momentarily interrupting the ignition for a predetermined desired interval of time, the ignition being automatically restored regardless of whether the mechanism responds normally to such interruption in effecting disengagement of the control elements.

Another object is to provide a simplified means of momentarily releasing the torque at the control elements to facilitate their release; also to provide such means whereby the usual interrupter switch and its mechanism actuating means may be eliminated.

Another object is to provide torque releasing means automatically operating by utilizing an electrical element inductively related to an appropriate part of the transmission control mechanism.

In carrying out my invention I preferably provide an electromagnet having a coil, herein termed a primary coil for convenience of reference, this coil being adapted for energization control, either de-energization or energization or variation in its energization, whereby to effect disengaging control on the releasable or shiftable drive control element. It is well known that when a coil is subjected to such energization change, an appreciable time interval occurs before the impressed electrical current stabilizes itself through the coil. This is occasioned by opposition to the change by reason of an induced current set up in the coil. Thus where the electromagnet is in the form of a solenoid, the solenoid coil has a definite time "build-up" depending on the number of turns in the coil, the impressed current, and other known factors. If the energization of the coil is changed from zero to a predetermined value, or from this value to zero, or from one value to another, a definite time interval or lag will occur before the coil reaches stability under the new condition. In carrying out my invention, I provide what may be termed a secondary coil disposed either around or adjacent one end of the primary coil so that it is inductively related with respect to the primary coil. By such arrangement a current will be induced in the secondary coil during the time lag incident to any of the aforesaid energization changes of the primary coil. I have provided means for utilizing this induced current to control torque impressed at the drive control elements so as to enable their relative disengagement. Inasmuch as the value and duration of the induced current is a function of the characteristics of the primary coil together with readily determinable factors of the secondary coil, such as the number of turns in the secondary coil, proximity of the secondary coil to the primary coil and other factors, it is possible by proper relationship between all the factors involved, to obtain an induced current in the secondary coil of desired value and duration to accomplish the intended functions and once established the device will always operate constantly insofar as there is no change in the factors involved.

In order to illustrate the principles involved in my invention I will describe in detail several typical systems of control in which the primary coil is changed in energization from zero to a predetermined value at the time of utilizing the current induced thereby for relieving the torque load at the drive control elements.

A further object of my invention, in a modified aspect, is to provide induction controlled torque-relieving means which is responsive in its operation to movement of an appropriate part of the operating mechanism for moving the drive control element or to some part which moves as an incident to movement of the drive control element.

In carrying out such modified form I either provide an arrangement for relatively moving a permanent magnet and a coil so as to induce the current for controlling the torque-relieving means, or I provide an arrangement for relatively moving a core of iron or equivalent conductor material and an assembly of primary and secondary coils. In the latter instance the secondary coil is arranged to control the torque-relieving means and the primary coil is either constantly energized during vehicle driving or energized as an incident to operation of the transmission control mechanism in bringing about movement of the drive control element.

In my invention, according to said modifications, the torque-relieving means is caused to function as many times or for such duration as may be necessary in order to bring about the desired movement of the drive control element inasmuch as the operation of the torque-relieving means is a function of movement of the drive control element or a part operably associated therewith.

It is therefore a further object of my invention to provide induction control means for the torque-releasing means which is capable of automatic response in its operation to a variety of conditions experienced as an incident to movement of the drive control element.

It is a further object of my invention to provide means for remedying the foregoing difficulties whereby the engine ignition is automatically restored even though the drive control elements are not disengaged during the engine interruption.

Another object is to provide a simple and effective means for guarding against the possibility of the transmission mechanism functioning to ground out the engine ignition longer than a desired predetermined time.

Further objects and advantages of my invention reside in the novel combination and arrangement of parts more particularly hereinafter described and claimed, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship for the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Fig. 11 is a similar view of a portion of the Fig. 10 control mechanism in another operating position.

Fig. 12 is a diagrammatic view illustrating the characteristics of my primary and secondary coils.

Fig. 13 is a view generally similar to Fig. 11 but illustrating a modified arrangement of induction control.

Fig. 14 is a similar view illustrating a further modified arrangement of induction control.

Fig. 15 is a similar view illustrating another modified arrangement of induction control.

While my control may be employed in conjunction with various types and arrangements of motor vehicle transmissions, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an over-running clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 150 to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of over-running clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at the time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 10 and 11, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a reciprocatory member or leader rod 68 which has a rear extension 69 aligned with rod 62.

In carrying out my invention I provide means which functions to relieve the thrust-application between the teeth of sleeve F and the teeth 49 thereby facilitating movement of the drive-control sleeve F from its engaging relationship into its disengaging relationship with respect to the teeth 49. Where the relief of the thrust-application is effected by momentary interruption of the engine ignition system, this means may take the following form.

The solenoid H comprises a coil 70 herein termed a primary coil and in inductive relationship with this coil, such as surrounding the same, I arrange a second or secondary coil 71 one end of which is grounded at 170 and the other end of which extends by a conductor 270 to a relay 370. The ignition system, hereinafter described in further detail, comprises the usual distributer 470 having the primary terminal 570. From terminal 570 there extends the grounding conductor 670 which also leads to the relay 370.

Relay 370 comprises switch means having a fixed switch point 770 to which conductor 670 extends. A movable switch point 870 is normally separated from switch point 770 and is grounded at 970 and electrically connected to the relay coil 171 to which conductor 270 extends.

Referring to Fig. 12 I have diagrammatically illustrated the functional characteristics of the primary coil 70 and secondary coil 71 by plotting amperes against time. Curve 271 illustrates the build-up time interval for the primary coil 70 when subjected to energization in the Fig. 10 system and curve 371, which is a sine curve, illustrates the corresponding current and duration thereof induced in the secondary coil 71 during the build-up in the primary coil.

When the primary coil 70 is energized, the resulting induced current in the secondary coil 71 is utilized to operate relay 370 to interrupt the ignition and then automatically restore the same in response to the build-up in the primary coil. Thus when the primary coil is energized, an induced electrical current is established in an induction circuit as follows: ground 170 and coil 171, through conductor 270 to coil 171 and ground 970. Energization of coil 171 causes switch point 870 to engage switch point 770 as long as the induced current is of required strength to overcome the light restoring spring 471. When these switch points are engaged, the ignition is grounded and the engine rendered inoperative such that it begins to coast instead of driving. This ignition grounding circuit comprises primary terminal 570, conductor 670 thence through the relay switch 770, 870 to ground 970. As the induced current in the secondary coil tapers off, the relay switch opens and the engine ignition system is restored to normal operation after a predetermined interval of time which may be readily varied as desired by changing one or more of the aforesaid factors which give rise to the characteristics illustrated by curves 271 and 371.

It will be noted that the ignition system is momentarily interrupted for a predetermined interval of time, the restoration occurring independently of whether or not the sleeve F has functioned properly during the interruption to move rearwardly into its released position.

Rod 68 is formed with a detent 72 which cooperates with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. Latch 73 thus provides a releasable holding means for the rod 68. At this time rod portion 69 moves further than rod 62 by the amount of gap 76, a stop 77 acting on lever 59 limiting forward movement of sleeve F by spring 58. The mechanism is illustrated to provide the lost-motion at gap 76 as set forth in said Neracher et al. application. However, as my invention no longer requires movement of rod 69 in advance of rod 62 for interrupting the ignition, rod 69 could, if desired, now be always directly connected to rod 62. However, I have illustrated the gap 76 to show how my invention may be applied to devices already in use.

When the latch 73 is released with the parts positioned as in Fig. 11, sleeve F being clutched, the spring 67 operates to close the gap 76 at the lost-motion between rod portion 69 and rod 62 where the mechanism is arranged to provide this gap. In any event, whether or not the gap is employed, the release of the holding means, such as latch 73, is effected by energizing coil 70 and this brings relay 370 into operation to momentarily interrupt the ignition. Ordinarily, when the ignition is thus interrupted, thereby relieving the thrust-application at the teeth of sleeve F, spring 67 then causes further movement of rod 68 to thrust on rod 62 and release sleeve F.

By reason of my invention the ignition system will be restored even though members 68 and 62 do not complete or even start their stroke which imparts releasing movement to sleeve F. Thus, let it be assumed that the sleeve F fails to releasingly move when the rod 68 moves as aforesaid to take up gap 76. When this occurs the ignition is interrupted and ordinarily the engine would be dead. However, after build-up of the primary coil the induction circuit falls off and relay 370 automatically acts to restore the ignition.

The vacuum supply to chamber 74 is under control of solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseal valve 81 so as to vent this chamber through passage 84, chamber 85 and vent passage 86. When the solenoid is de-energized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the break-away being under control of a detent 91 if desired.

The sleeve 89 has a shoulder 92 engaged by the swinging switch piece 93 of the governor switch 94. When the car is stationary the detent 91 is engaged and switch 94 is closed. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at approximately 7 and 15 M. P. H. (miles per hour), the switch 94 closing on stopping the car in direct and second at approximately 7 and 3 M. P. H. respectively.

The driver operated ignition switch is designated at L and comprises a conductor 96 which, in the Fig. 10 position showing the switch "on" or closed, electrically connects contacts 97 and 98. Contact 97 extends by conductor 99 to ammeter 100 and thence by conductor 101 to the usual storage battery 102 and thence to ground 103. Contact 98 has a conductor 104 extending therefrom to the engine ignition system herein shown in part as comprising coil 105 and distributor 470 having the aforesaid primary terminal 570.

A second conductor 108 extends from contact 98 to the primary coil 70 of solenoid H and thence by conductor 109 to two conductors 111 and 112, the former extending to governor switch 94 and thence to ground 113. Conductor 112 extends to kickdown switch 114 and thence to ground 115. The switch 114 is normally open and is closed preferably by a full depression of accelerator pedal 50' acting through link 116 and a bellcrank lever 116ª pivotally mounted at 116ᵇ. Lever 116ª actuates a link 116ᶜ which extends forwardly to adjust the engine throttle valve lever 117. When pedal 50' is thus depressed, the lever 117 is positioned to fully open the throttle valve 118 and as the throttle valve is adjusted in its wide-open range the lever 116ª closes switch 114 to effect a step-down in the transmission from fourth to third or from second to first by energizing the solenoid H.

The governor solenoid circuit is as follows: ground 103 to battery 102 thence by conductor 101 to ammeter 100 and by conductor 99 to ignition switch L. From switch L this circuit extends through conductor 108 and solenoid H and thence by conductors 109 and 111 to switch 94 and ground 113.

The kickdown solenoid circuit is the same as the governor solenoid circuit to conductor 109 whence this circuit extends by conductor 112 to kickdown switch 114 and ground 115.

The engine ignition circuit is the same as the governor solenoid circuit up to the ignition switch L whence this circuit extends by conductor 104 to coil 105 and distributor 470.

In the aforesaid Neracher et al. application there is set forth certain circumstances under which the transmission becomes locked-up, with sleeves F and 42 clutched and under torque load, so as ordinarily to render the engine ignition inoperative. With my invention the ignition system is automatically restored under such conditions making it possible for the engine to operate to drive the car and to unload the teeth of sleeve F so that the same may then be released by spring 67. It is impossible to manipulate the mechanism so as to permanently ground the ignition and in this connection the gap at 76, when employed, no longer gives rise to undesired prolonged ignition interruption as heretofore an interrupter switch was closed when gap 76 was taken up, the interrupter switch being mechanically operated in response to initial rearward movement of rod 68. My invention eliminates such mechanism attendant to the aforesaid interrupter switch.

In the operation of the mechanism, the car at standstill and with the ignition switch L closed and the engine idling will cause the solenoid H to be energized as in Fig. 10 because governor switch 94 is closed thereby establishing the governor solenoid circuit. Cylinder 74 is vented and sleeve F disengaged. The driver shifts sleeve 42 to either the high or low range and accelerates the car ordinarily above the critical speed of governor J thereby causing switch 94 to open to break the governor solenoid circuit. As vacuum builds up in the engine intake manifold K, plunger 80 now being lowered by spring 83 because switch 94 is open, piston 66 will be operated by vacuum thereby moving rod 68 to its Fig. 11 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, switch 114 closes thereby energizing the kick-down solenoid circuit and causing solenoid H to raise plunger 80 and release latch 73 thereby venting chamber 74. At this time the sleeve F is under driving torque from the engine operating under wide open throttle. However, when latch 73 is released, spring 67 operates rod 68 rearwardly and at the same time the ignition system is interrupted under control of relay 370. This relieves the torque at sleeve F and spring 67 ordinarily operates to fully release the sleeve whereupon the ignition is restored under control of relay 370 and the engine quickly speeds up to engage overrunning clutch E for establishing the third or first driving ratio depending on the setting of sleeve 42 prior to the kick-down operation. If the sleeve F is not released during the ignition interruption then the relay will in any event operate to restore the ignition and prevent a dead engine condition.

On bringing the car to a stop when sleeve F is clutched as in fourth for example, the governor J opens governor switch 94 so as to de-energize solenoid H, vent chamber 74 and cause release of sleeve F so that the car will be started in third, assuming the manual sleeve 42 to be left in its forward high range shift position. Here again, the ignition will be automatically restored if for any reason the sleeve F fails to release.

Referring to Fig. 13 I have illustrated a modified arrangement of induction control which may be substituted for the induction control in the Fig. 10 system of transmission control mechanism.

In Fig. 13 I have dispensed with the secondary coil 71 although the coil H otherwise operates as aforesaid in controlling the movement of piston 66. The induction circuit is now controlled as a function of movement of some part operatively associated with the movable drive control element herein illustrated as a shiftable clutch sleeve F. This part may be the rod 68 and in Fig. 13 I attach to the front end of this rod a permanent magnet M of an electromagnet such that this magnet M moves as a fixed part of rod 68. The magnet thus comprises the core or moving armature of the electromagnet and has its opposite poles at its axial end portions and when it moves along its axis it will induce a current in the coil N which is inductively associated with the magnet as by positioning the coil to lie closely around the magnet when the rod 68 is held in its Fig. 13 position corresponding to release of sleeve F. This coil has a brass or equivalent inner sleeve 120 and is otherwise surrounded by a casing of iron 121 or equivalent. The induction circuit now comprises ground 122, coil N thence through conductor 123 to the same relay 370 and ground 970 such that the relay will function in response to the induced current to ground the engine ignition system by ground conductor 670, relay switch 770 and ground 970.

When the parts are positioned as in Fig. 13 the gap 76 now has particular significance in accommodating movement of rod 68 rearwardly sufficiently to cause magnet M to establish an induced current in coil N thereby grounding the ignition system so as to accommodate further movement of rod 68. This further movement of rod 68, after taking up gap 76 and establishing a thrust-transmitting relationship between rod portion 69 and follower rod 82, then serves to move sleeve F into its Fig. 3 released position. In the event that the direction of torque between sleeve F and teeth 49 changes from drive to coast load, for example, before the sleeve F is fully released and while the ignition is grounded by reason of movement of rod 68 and magnet M rearwardly, the ignition is not thereby interrupted for an undesired length of time because under these conditions the sleeve F ceases to move rearwardly and likewise magnet M ceases its rearward movement. This automatically causes the induced current to fall off with the result that relay switch 770 opens and the ignition system is restored to normal operation. This in turn causes the direction of torque load at teeth 49 and sleeve F to again reverse and during this interval the rod 68 and magnet M again move rearwardly and if the sleeve F is not then fully released the cycle of ignition interruption and restoration is again repeated. Ordinarily the sleeve F will release during the first interruption of the ignition system but if it resists such release by tendency of the parts to stick, as in cold weather, then my mechanism functions to move the sleeve F in progressive stages of shift and in no event will the ignition interruption be unduly prolonged as it is automatically restored approximately as soon as movement of magnet M ceases.

The Fig. 13 mechanism otherwise operates just as recited for the Fig. 10 arrangement, the solenoid H being energized to vent chamber 74 and allow spring 67 to force rod 68 rearwardly to urge disengagement of sleeve F from teeth 49 whenever either the switch 94 closes or the kick-down switch 114 is closed. Engagement of sleeve F as an incident to coast of the engine, when switches 94 and 114 are open, is just as previously set forth and need not be repeated.

Referring now to Fig. 14 I have illustrated another modified arrangement of induced current control for effecting ignition interruption. Instead of a permanent magnet M as in Fig. 13, I now provide electromagnetic means comprising an ordinary plunger or core-piece O carried by the rod 68. This movable core is of iron or equivalent and surrounding the core is a primary coil 124 and a secondary coil 125 inductively associated therewith. One end of coil 124 is grounded at 126 and the other end is connected by conductor 127 to the conductor 108 so that the primary coil 124 is supplied with a steady current from battery 102 whenever the ignition switch L is closed. The secondary coil 125 extends between ground 170 and relay 370 just as in Fig. 10.

In operation, when the kick-down switch 114 is closed with the parts in their Fig. 14 position, movement of the core O in taking up gap 76 will cause a current to be induced in the secondary coil 125 and this will act just as in Fig. 13 to interrupt the ignition so that the sleeve F will be released upon further movement of rod 68. Also, as for Fig. 13, a series of momentary ignition interruptions will be effected if the sleeve F should tend to lag, thereby insuring successive increments of sleeve releasing movements by spring 67 during periods of torque reversal. Otherwise the Fig. 14 system operates just as described for the Fig. 10 system.

The Fig. 15 modification is identical to Fig. 14 except that the primary solenoid 124 has its grounding conductor 128 connected to the grounding conductor 108 of solenoid H. Therefore in Fig. 14 the primary coil is not continuously energized as the primary circuit from switch L and conductor 108 is not established until conductor 128 is grounded either at 115 by the kick-down switch 114 or at 113 by the governor switch 94.

In Fig. 15 current is induced in the secondary coil 125 for grounding the ignition system during the build-up of the primary coil 124 and thereafter whenever the core O moves as in Fig. 14. In operation the Fig. 15 system is just as set forth for Fig. 10 except for the ignition control which, in effect, is a combination of the Fig. 10 and Fig. 14 arrangements. With the parts as in Fig. 15, when conductor 128 is grounded as by closing the switch 114 for kick-down by way of example, solenoid H is energized as before to vent chamber 74 and cause spring 67 to urge rod 68 and core O rearwardly to release sleeve F. At the time the solenoid H is energized, primary coil 124 is also energized and during its build-up as explained in Fig. 12, a current is induced in the secondary coil 125 to operate relay switch 770 and ground the ignition. Furthermore, movement of rod 68 and core O rearwardly also cause a current to be induced in the secondary coil thereby prolonging the ignition interruption over the build-up time of the primary coil. Also, if the sleeve F should not release at this time, then as in Fig. 14 there will occur cycles of torque reversals and momentary ignition interruptions until the sleeve F is fully released.

I claim:

1. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; switch means operable to control said ignition system; an electromagnet comprising a primary coil; means operable under control of said electromagnet for controlling movement of said moveable element such that said element is urged toward its said disengaging relationship in response to energization of the primary coil of said electromagnet; and a secondary coil in inductive relationship with respect to said primary coil for controlling operation of said switch means as an incident to energization of said primary coil.

2. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; switch means operable to control said ignition system; an electromagnet comprising a primary coil; means operable under control of said electromagnet for controlling movement of said movable element into its said disengaging relationship; and means including a secondary coil in inductive relationship with respect to said primary coil for controlling operation of said switch means.

3. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; an electromagnet comprising a primary coil; means operable under control of said electromagnet for controlling movement of said movable element such that said element is urged toward its said disengaging relationship in response to energization of the primary coil of said electromagnet; means for interrupting said ignition system; an electrical relay for controlling said interrupting means; and a secondary coil in inductive relationship with respect to said primary coil for controlling said relay.

4. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means for interrupting said ignition system; an electromagnet comprising a primary coil; means operable under control of said electromagnet for controlling movement of said movable element into its said disengaging relationship; an electrical relay for controlling said interrupting means; and a secondary coil in inductive relationship with respect to said primary coil for controlling said relay.

5. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means for effecting relief of said thrust-application; an electromagnet; means operable under control of said electromagnet for controlling movement of said movable element into its said disengaging relationship; and means including an electrical element disposed in inductive relationship with said electromagnet for controlling said thrust-relieving-means.

6. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means for effecting relief of said thrust-application; an electromagnet; means operable under control of said electromagnet for controlling movement of said movable element into its said disengaging relationship; a relay for controlling said thrust-relieving-means; and means disposed in inductive relationship with said electromagnet for controlling said relay.

7. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; relay controlled grounding means for said ignition system; electromagnetically controlled means operable to effect disengaging movement of said movable element; and means inductively associated with said electromagnet for controlling said relay.

8. In a drive for a motor vehicle having an engine; transmission mechanism comprising torque-transmitting drive means releasable upon relief of torque; means for effecting said torque relief; electrically controlled means operable to release said drive means; and means including an electrical element inductively related to said electrically controlled means for controlling said torque relief means.

9. In a drive for a motor vehicle having an engine; transmission mechanism comprising torque-transmitting drive means releasable upon relief of torque; relay controlled means for effecting said torque relief; electrically controlled means operable to release said drive means; and means inductively related to said electrically controlled means for controlling said relay.

10. In a drive for a motor vehicle according to claim 8; a single driver operable member; and means operating in response to driver operation of said single member for controlling operation of said electrically controlled means.

11. In a drive for a motor vehicle according to claim 8; a speed responsive control device operable in response to predetermined speed of travel of the vehicle; and means operating in response to operation of said speed responsive control device for controlling operation of said electrically controlled means.

12. In a drive for a motor vehicle according to claim 8; a single driver operable member; a speed responsive control device operable in response to predetermined speed of travel of the vehicle; and means selectively operating in response to driver operation of said single member and to operation of said speed responsive control device for controlling operation of said electrically controlled means.

13. In a drive for a motor vehicle having an engine provided with a throttle; means operable by the vehicle driver for controlling opening and closing of said throttle; transmission mechanism comprising torque-transmitting means releasable upon relief of torque; means for effecting said torque relief; electrically controlled means operable to release said drive means; means including an electrical element inductively related to said electrically controlled means for controlling said torque relief means; and means operating in response to driver operation of said throttle controlling means for throttle opening for controlling energization of said electrically controlled means.

14. In a drive for a motor vehicle having an engine; transmission mechanism comprising torque-transmitting drive means releasable upon relief of torque; a coil adapted for electrical energization and having a predetermined time characteristic of response to change in its energization; means operable under control of energization change of said coil for urging release of said drive means; and means operably responsive to energization change of said primary coil for effecting momentary interruption of said torque as a function of said time characteristic.

15. In a drive for a motor vehicle having an engine; transmission mechanism comprising torque-transmitting drive means releasable upon relief of torque; an electromagnet having a primary coil adapted for electrical energization and having a predetermined time characteristic of response to change in its energization; means operable under control of energization change of said coil for urging release of said drive means; a secondary coil in inductive relationship with said primary coil; and means operably responsive to inductive energization of said secondary coil for effecting momentary interruption of said torque as a function of said time characteristic.

16. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a relay operable to interrupt said ignition system; electrical circuit means, including a coil adapted to be inductively energized, for operating said relay; and means for inducing an electrical current in said coil thereby to energize said circuit means.

17. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a relay operable to interrupt said ignition system; electrical circuit means, including a coil adapted to be inductively energized, for operating said relay; means operable for biasing said movable element toward its said disengaging relationship; means for controlling operation of said biasing means; and means for inducing an electrical current in said coil thereby to energize said circuit means.

18. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means operably associated with said movable element for urging said movable element into its said disengaging relationship; the last said means including a member adapted for movement as an incident to disengaging movement of said movable element; and inductively energizable means including a part inductively associated with said member for effecting interruption of said ignition system in response to relative movement between said member and said part.

19. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; current inducing means including relatively movable coil and armature parts inductively disposed with respect to each other; means for moving one of said parts as an incident to disengaging movement of said relatively movable element; and means utilizing current induced incident to relative movement of said parts for effecting interruption of said ignition system.

20. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a follower member operably associated with said movable element for moving the same into its said disengaging relation; a leader member adapted for movement relative to said follower member to a position of said leader member providing thrust-transmission to said follower member; current inducing means including relatively movable coil and armature parts inductively disposed with respect to each other; means for effecting movement of one of said parts as an incident to said movement of said leader member relative to said follower member; and means utilizing current induced incident to relative movement of said parts for effecting interruption of said ignition system.

21. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; current inducing means including relatively movable coil and permanently magnetized parts inductively disposed with respect to each other; means for moving one of said parts as an incident to disengaging movement of said relatively movable element; and means utilizing current induced incident to relative movement of said parts for effecting interruption of said ignition system.

22. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a follower member operably associated with said movable element for moving the same into its said disengaging relation; a leader member adapted for movement relative to said follower member to a position of said leader member providing thrust-transmission to said follower member; current inducing means including relatively movable coil and permanently magnetized parts inductively disposed with respect to each other; means for effecting movement of one of said parts as an incident to said movement of said leader member relative to said follower member; and means utilizing current induced incident to relative movement of said parts for effecting interruption of said ignition system.

23. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; current inducing means comprising inductively associated primary and secondary coils, and an armature inductively associated with said coils; means for energizing said primary coil; means for moving said armature as an incident to disengaging movement of said relatively movable element; and means utilizing current induced in said secondary coil for effecting interruption of said ignition system.

24. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a follower member operably associated with said movable element for moving the same into its said disengaging relation; a leader member adapted for movement relative to said follower member to a position of said leader member providing thrust-transmission to said follower member; current inducing means comprising inductively associated primary and secondary coils, and an armature inductively associated with said coils; means for energizing said primary coil; means for moving said armature as an incident to said movement of said leader member relative to said follower member; and means utilizing current induced in said secondary coil for effecting interruption of said ignition system.

25. In a drive for a motor vehicle according to claim 23; means operable to urge disengaging movement of said movable element; and control means operable to effect, coincidentally, operation of said disengaging means and energization of said primary coil by said primary-coil-energizing means.

26. In a drive for a motor vehicle according to claim 24; means operable to control said movement of said leader member relative to said follower member; and means responsive to operation of said control means for effecting energization of said primary coil by said primary-coil-energizing means.

27. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to relieve said thrust-transmission; electrical circuit means, including a coil adapted to be inductively energized, for controlling said thrust-transmission relieving means; and means for inducing an electrical current in said coil thereby to energize said circuit means.

28. In a drive for a motor vehicle having an engine; transmission mechanism operable to provide a drive from the engine to the vehicle, said mechanism including positively engageable drive-control elements one of which is movable into engaging relationship with respect to the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to relieve said thrust-transmission; electrical circuit means, including a coil adapted to be inductively energized, for controlling said thrust-transmission relieving means; means operable for biasing said movable element toward its said disengaging relationship; means for controlling operation of said biasing means; and means for inducing an electrical current in said coil thereby to energize said circuit means.

IAN C. McKECHNIE.